(12) United States Patent
Li et al.

(10) Patent No.: US 12,107,641 B2
(45) Date of Patent: Oct. 1, 2024

(54) ETHERNET POWER SOURCING EQUIPMENT AND POWER MANAGEMENT METHOD THEREOF

(71) Applicant: REALTEK SEMICONDUCTOR CORP., Hsinchu (TW)

(72) Inventors: He Li, Hsinchu (TW); Rui Wang, Hsinchu (TW); Qi-Cai Tang, Hsinchu (TW); Min Zhang, Hsinchu (TW); Teng-Yue Zhang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 377 days.

(21) Appl. No.: 17/459,153

(22) Filed: Aug. 27, 2021

(65) Prior Publication Data

US 2022/0069864 A1 Mar. 3, 2022

(30) Foreign Application Priority Data

Sep. 3, 2020 (CN) .......................... 202010915261.1

(51) Int. Cl.
*H04B 3/54* (2006.01)
*H04L 12/10* (2006.01)

(52) U.S. Cl.
CPC ............... *H04B 3/54* (2013.01); *H04L 12/10* (2013.01)

(58) Field of Classification Search
CPC ...... H04B 3/54; H04L 12/10; H04L 12/40045
See application file for complete search history.

(56) References Cited

U.S. PATENT DOCUMENTS

| | | | |
|---|---|---|---|
| 7,353,407 B2 * | 4/2008 | Diab ................... | H04L 41/0806 713/340 |
| 2006/0053324 A1 * | 3/2006 | Giat ....................... | H04L 12/10 713/300 |

FOREIGN PATENT DOCUMENTS

| | | |
|---|---|---|
| CN | 102761422 B | 8/2015 |
| CN | 106341237 A | 1/2017 |
| TW | I536766 B | 6/2016 |
| WO | WO 2016/202081 A1 | 12/2016 |

* cited by examiner

*Primary Examiner* — Kabir A Timory
(74) *Attorney, Agent, or Firm* — Birch, Stewart, Kolasch & Birch, LLP

(57) ABSTRACT

An Ethernet power sourcing equipment (PSE) and a power management method thereof are provided. The Ethernet PSE includes a plurality of ports and a controller. Each port is coupled to a powered device (PD), to supply power to the PD through the port when the PD is in a power supply stage. When the PD enters a startup stage before the power supply stage, the controller calculates a remaining power quota based on a power quota allocated to the PD.

18 Claims, 1 Drawing Sheet

ETHERNET POWER SOURCING EQUIPMENT AND POWER MANAGEMENT METHOD THEREOF

CROSS-REFERENCE TO RELATED APPLICATION

This non-provisional application claims priority under 35 U.S.C. § 119(a) to Patent Application No. 202010915261.1 filed in China, P.R.C. on Sep. 3, 2020, the entire contents of which are hereby incorporated by reference.

BACKGROUND

Technical Field

The present invention relates to an Ethernet power supply technology, and in particular, to an Ethernet power sourcing equipment (PSE) and a power management method thereof.

Related Art

In an existing power over Ethernet (POE) system, if a plurality of powered devices (PDs) are coupled to an Ethernet PSE simultaneously and request power supply from the Ethernet PSE in a short period of time, for example, when a PD requests power supply from the Ethernet PSE in a startup stage, because a power consumed by the PD fluctuates greatly and is unstable when the PD is just started, a power consumption of the PD that is measured by the Ethernet PSE is caused to be far different from an actual power consumption of the PD. Consequently, the actual power consumptions of the PDs exceed an upper limit of power that can be supplied by the Ethernet PSE, triggering an overload protection mechanism of the Ethernet PSE and causing highly unstable power receiving states of the PDs.

In addition, after the overload protection mechanism is triggered and some PDs are powered off, when determining that the remaining power of the Ethernet PSE is sufficient to be supplied to the PDs that are previously powered off, the Ethernet PSE starts to supply power to the PDs again. However, because the power consumed by the PDs fluctuates greatly when the PDs are just started, the PDs trigger the overload protection mechanism of the Ethernet PSE again and are powered off, resulting in power hiccups, that is, continuous power supply and power-off.

SUMMARY

In view of the above, the present invention provides an Ethernet PSE and a power management method thereof, to alleviate unstable power receiving states of a plurality of PDs when the PDs are connected to the Ethernet PSE simultaneously.

According to some embodiments, the Ethernet PSE includes a plurality of ports and a controller. Each port is coupled to a PD, to supply power to the PD through the port when the PD is in a power supply stage. When the PD enters a startup stage before the power supply stage, the controller calculates a remaining power quota based on a power quota allocated to the PD.

According to some embodiments, when the PD is in the power supply stage, the controller calculates the remaining power quota based on a measured power consumption of the PD.

According to some embodiments, a variation amplitude of the measured power consumption of each PD in the startup stage is greater than a variation amplitude of the measured power consumption of the PD in the power supply stage.

According to some embodiments, the measured power consumption is an average power consumption measured in a time window.

According to some embodiments, the measured power consumption of each PD does not exceed the power quota allocated to the PD.

According to some embodiments, when the PD is in a grading stage, the controller detects a power level of the PD, to determine the power quota allocated to the PD according to the power level.

According to some embodiments, the controller adds the power quotas of the PDs in the startup stage at a time point to obtain a first sum, adds measured power consumptions of PDs in the power supply stage at the same time point to obtain a second sum, and subtracts the first sum and the second sum from a total power of the Ethernet PSE to obtain the remaining power quota through calculation.

According to some embodiments, the time point is a time point at which the controller evaluates whether to allow the PD to be powered to enter the startup stage.

According to some embodiments, the controller determines a duration of the startup stage according to a requested power supply rate of each PD and an overload tolerance of the Ethernet PSE.

According to some embodiments, the power management method of the Ethernet PSE includes: supplying power to a PD when the PD is in a power supply stage; and calculating a remaining power quota based on a power quota allocated to the PD when the PD enters a startup stage before the power supply stage.

Therefore, according to some embodiments, when the PD enters the startup stage, the Ethernet PSE calculates the remaining power quota of the Ethernet PSE based on the power quota allocated to the PD, that is, a maximum power that can be consumed or borne by the PD and that is allocated to the PD in the grading stage, to ensure that the remaining power of the Ethernet PSE is sufficient to be supplied to other PDs, thereby avoiding power hiccups when a plurality of PDs request power supply in a short time and improving the power supply quality of the Ethernet PSE.

DETAILED DESCRIPTION

Figure 1:
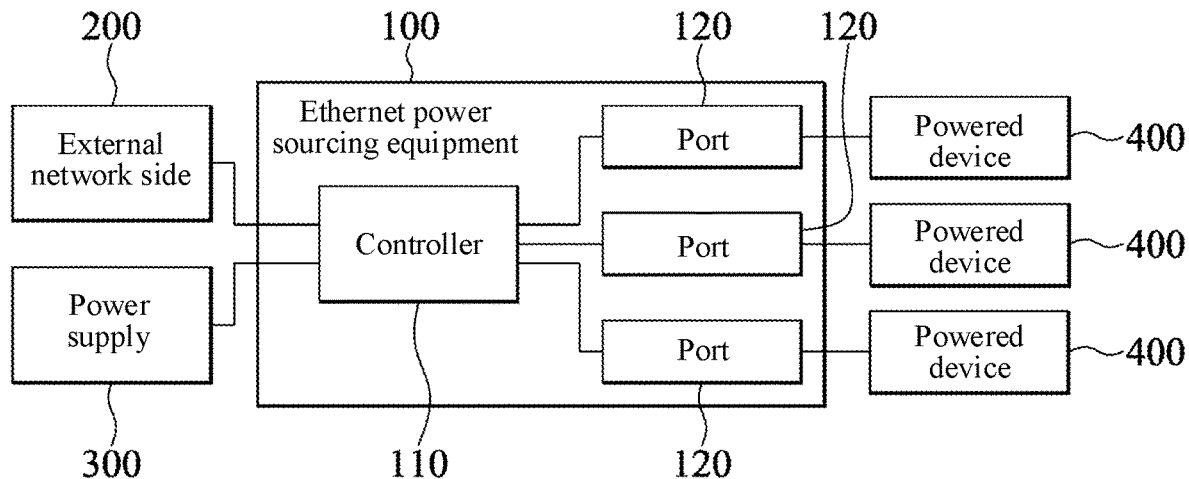
FIG. 1 is a schematic block diagram of an Ethernet PSE according to an embodiment of the present invention.
Figure 2:
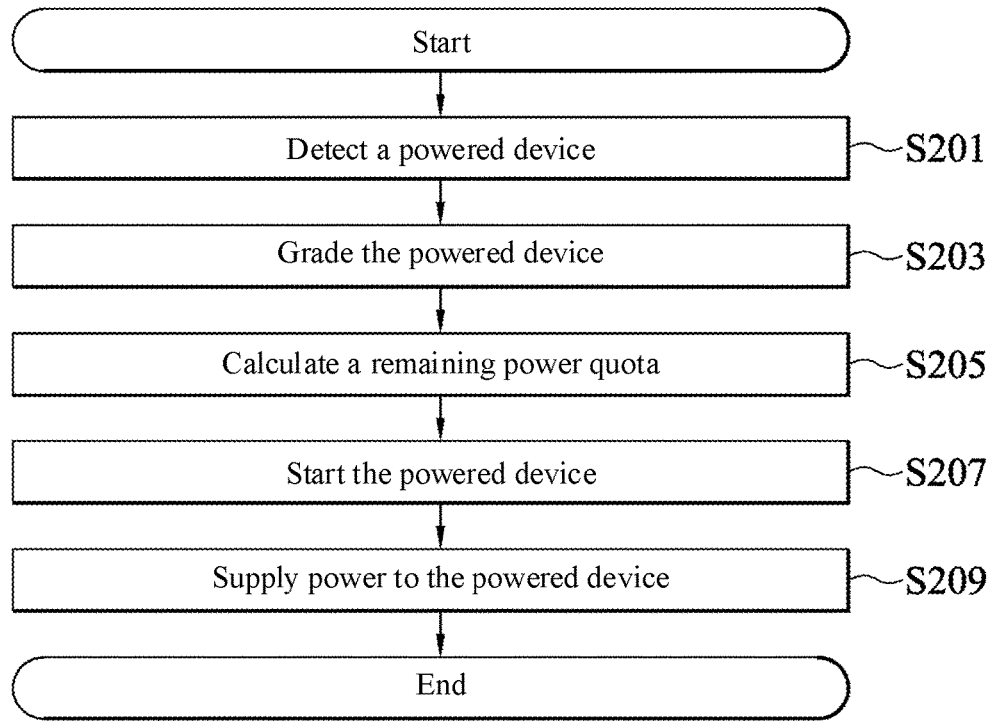
FIG. 2 is a schematic flowchart of a power management method of the Ethernet PSE according to an embodiment of the present invention.

Refer to both FIG. 1 and FIG. 2. FIG. 1 is a schematic block diagram of an Ethernet PSE 100 according to an embodiment of the present invention. FIG. 2 is a schematic flowchart of a power management method of the Ethernet PSE 100 according to an embodiment of the present invention. The Ethernet PSE 100 is adapted to performing the power management method. The Ethernet PSE 100 includes a controller 110 and a plurality of ports 120. The controller 110 is coupled to an external network side 200, a power supply 300, and the port 120. The external network side 200 is configured to provide network data. The power supply 300 is configured to supply power to the Ethernet PSE 100. Each port 120 is coupled to a PD 400, to transmit the power and network data to the PD 400. The controller 110 is configured to perform the power management method, to transmit the power received from the power supply 300 and the network data received from the external network side 200 to the PD 400 through the port 120 and calculate a remaining power quota of the Ethernet PSE 100 to determine whether there is spare power to be supplied to other PDs 400 to be powered. The remaining power quota is a total power obtained by the Ethernet PSE 100 from the power supply 300 minus the power supplied to the PD 400 already powered.

The Ethernet PSE 100 is, for example but not limited to, an Ethernet swapper, an Ethernet power hub, an Ethernet power supply, or an Ethernet splitter. The controller 110 is, for example but not limited to, a central processing unit (CPU), a microprocessor, an application-specific integrated circuit (ASIC), or a system on a chip (SOC). The port 120 is, for example but not limited to, an RJ45 connector. The PD 400 may be a device having an Ethernet power supply technology, for example but not limited to, a web camera, a router, a mobile device, a computer, or a laptop. The power supply 300 may be implemented by an apparatus or a circuit capable of supplying power, for example, a power adapter, or a battery.

In some embodiments, the Ethernet PSE 100 may include a power supply 300, that is, the Ethernet PSE 100 does not need to obtain power from an external power source. In some embodiments, the port 120 is coupled to the PD 400 through an Ethernet cable. The Ethernet cable is, for example but not limited to, two pairs or four pairs of twisted copper wires. In some embodiments, the external network side 200 may be a server, and is coupled to the Ethernet PSE 100 through the Ethernet cable. In some embodiments, the Ethernet PSE 100 and the PD 400 supply and receive power in conformance with the standards of IEEE802.3af, IEEE802.3at, and IEEE802.3bt.

In some embodiments, when the PD 400 is in a power supply stage, the Ethernet PSE 100 supplies power to the PD 400 through the port 120. In the power supply stage, a voltage (for example, a fully-loaded output voltage or a rated output voltage of the Ethernet PSE 100) is stably supplied to the PD 400, a power (for example, a power requested by the PD 400 from the Ethernet PSE, or a fully-loaded output power or a rated output power of the Ethernet PSE 100) is stably supplied to the PD 400, or a voltage or power conforming to the standards of IEEE802.3af, IEEE802.3at, and IEEE802.3bt (for example, an output power of the Ethernet PSE 100 or a requested power of the PD 400 that is specified based on the standards of IEEE802.3af, IEEE802.3at, and IEEE802.3bt) is stably supplied to the PD 400. In some embodiments, there is power dissipation during transmission, so that the output power of the Ethernet PSE 100 may be greater than the power requested by the PD 400.

Refer to FIG. 2. When the PD 400 to be powered is coupled to the Ethernet PSE 100, the Ethernet PSE 100 performs step S201. The controller 110 detects whether the PD 400 is a device meeting an Ethernet power supply condition (that is, the PD 400 is in a detection stage). For example, the Ethernet PSE 100 provides a plurality of test voltages of different voltage levels to the PD 400 through the port 120. The controller 110 calculates an impedance value (for example, a co-module resistance) of the PD 400 by using the test voltages and Ohm's law, or calculates a capacitance value by using the test voltages. If the impedance value and the capacitance value do not meet the Ethernet power supply condition, the Ethernet PSE 100 directly ends (not shown), that is, no power is supplied to the PD 400. Herein, the test voltage may be a test voltage specified in the detection stage of the Technical Standards for POE of IEEE802.3af, IEEE802.3at, and IEEE802.3bt, for example, a voltage between 2.8 V and 10 V. The Ethernet power supply condition may be an impedance value and a capacitance value specified in the detection stage of the Technical Standards for POE of IEEE802.3af, IEEE802.3at, and IEEE802.3bt, for example, an impedance value between 19 kilohm and 26.5 kilohm and a capacitance value no more than 150 F.

If the PD 400 to be powered meets the Ethernet power supply condition, the Ethernet PSE 100 performs step S203. The controller 110 detects a power level of the PD 400 (that is, the PD 400 is in a grading stage), to determine a power quota allocated to the PD 400 in according to the power level. Specifically, the Ethernet PSE 100 applies a grading detection voltage to the PD 400 through the port 120. The controller 110 measures a current of the PD 400 through the port 120, searches for the power level corresponding to the PD 400 according to the magnitude of the current and Table 1, and determines the power quota allocated to the PD 400 according to the power level and Table 2. Herein, the grading detection voltage may be a grading detection voltage specified in the grading stage of the Technical Standards for POE of IEEE802.3af, IEEE802.3at, and IEEE802.3bt, for example, a voltage between 15.5 V and 20.5 V. In some embodiments, time for performing step S203 cannot exceed the time specified in the Technical Standards for POE of IEEE802.3af, IEEE802.3at, and IEEE802.3bt, for example, the time cannot exceed 75 milliseconds.

TABLE 1

| Power level | Current |
|---|---|
| 0 | <0.4 mA |
| 1 | 10.5 mA |
| 2 | 18.5 mA |
| 3 | 28 mA |
| 4 | 40 mA |

TABLE 2

| Power level | Power quota |
|---|---|
| 0 | 15.4 W |
| 1 | 4 W |
| 2 | 7 W |
| 3 | 15.4 W |
| 4 | 30 W |

In some embodiments, Table 1 and Table 2 may be comparison tables conforming to the standards of IEEE802.3af, IEEE802.3at, and IEEE802.3bt. The power quota in Table 2 may be a maximum power consumption that the PD 400 can consume, a maximum power that the PD 400 can bear, or a power that the Ethernet PSE 100 can supply that is specified in the power classification standards of IEEE802.3af, IEEE802.3at, and IEEE802.3bt. In some embodiments, Table 1 and Table 2 may be stored in the controller 110. In some embodiments, Table 1 and Table 2 may be integrated into a single comparison table.

After completing grading of the PD 400 to be powered, the Ethernet PSE 100 performs step S205. The controller 110 calculates a remaining power quota, to determine whether there is spare power to be supplied to the PD 400 to be powered. If the remaining power of the Ethernet PSE 100 is sufficient to be supplied to the PD 400 to be powered, step S207 is performed.

In step S207, the controller 110 supplies power received from the power supply 300 to the PD 400 through the port 120 from a low voltage and in a manner of gradually increasing the voltage, to start the PD 400, and stops increasing the voltage when a fully-loaded output voltage (or a rated output voltage) is reached. At this time, the Ethernet PSE 100 continuously supplies the fully-loaded output voltage (or the rated output voltage) to the PD 400, that is, step S209 is performed. Herein, if the voltage applied by the Ethernet PSE 100 to the PD 400 does not reach the fully-loaded output voltage (or the rated output voltage), it indicates that the PD 400 is in a startup stage. If the voltage applied by the Ethernet PSE 100 to the PD 400 reaches the fully-loaded output voltage (or the rated output voltage), it indicates that the PD 400 is in a power supply stage. The fully-loaded output voltage (or the rated output voltage) may be a fully-loaded output voltage (or a rated output voltage) conforming to the standards of IEEE802.3af, IEEE802.3at, and IEEE802.3bt, for example, a voltage of 48 V, 57 V, and the like. In some embodiments, after the Ethernet PSE 100 supplies the fully-loaded output voltage (or the rated output voltage) to the PD 400, the PD 400 experiences a delay before receiving the fully-loaded output voltage (or the rated output voltage) from the Ethernet PSE 100. In other words, when the voltage applied by the Ethernet PSE 100 to the PD 400 reaches the fully-loaded output voltage (or the rated output voltage), the PD 400 first experiences a delay and then enters the power supply stage (that is, the startup stage of the PD 400 includes a period in which the voltage applied by the Ethernet PSE 100 to the PD 400 does not reach the fully-loaded output voltage (or the rated output voltage) and a delay after the voltage applied by the Ethernet PSE 100 to the PD 400 reaches the fully-loaded output voltage (or the rated output voltage). That is, the PD 400 stably receives power from the Ethernet PSE 100 for self-consumption after a delay. The delay is set to avoid a surge current when the PD 400 receives the power of the fully-loaded output voltage (or the rated output voltage) from the Ethernet PSE 100, thereby ensuring that the PD 400 is not damaged by the surge current. In some embodiments, the delay may be a delay conforming to the standards of IEEE802.3af, IEEE802.3at, and IEEE802.3bt, for example, the delay may be at least 80 microseconds. In some embodiments, during the delay, the PD 400 has lower power consumption relative to that in the power supply stage and has power consumption fluctuations.

In step S205, if the powered PD 400 is in the startup stage, the controller 110 calculates the remaining power quota according to the power quota allocated to the powered PD 400. Specifically, the controller 110 subtracts the power quota allocated to the powered PD 400 from the total power received from the power supply 300, to calculate the remaining power quota. As shown in formula 1, $P_{rmn}$ is a remaining power quota, $P_{bank}$ is a total power, and $P_{alc}$ is a power quota. The power quota is a maximum power that the Ethernet PSE 100 can supply to the PD 400 or a maximum power that the PD 400 can bear. Since the power consumed by the PD 400 varies greatly when the PD 400 is in the startup stage, the remaining power quota is calculated based on the power quota, so that the controller 110 can ensure according to the remaining power quota that the remaining power of the Ethernet PSE 100 is sufficient to be supplied to other PDs 400 to be powered, to avoid power hiccups caused by the power variation of the PD 400 that causes the PD 400 unable to receive power stably, that is, to avoid that the Ethernet PSE 100 cannot stably supply power to the PD 400, thereby improving the power supply quality of the Ethernet PSE 100.

$$P_{rmn} = P_{bank} - \mathrm{SUM}(P_{alc}) \quad \text{(formula 1)}$$

In step S205, if the powered PD 400 is in the power supply stage, the controller 110 calculates the remaining power quota based on a measured power consumption of the PD 400. That is, the controller 110 subtracts the measured power consumption from the total power received from the power supply 300, to calculate the remaining power quota. As shown in formula 2, $P_{rmn}$ is a remaining power quota, $P_{bank}$ is a total power, and $P_{mear}$ is a measured power consumption. A power measuring manner may be, for example, that the controller 110 obtains, through the port 120, the magnitude of the voltage applied to the PD 400 and the magnitude of the current of the PD 400, and calculates the measured power consumption of the PD 400 according to the voltage and the current. In some embodiments, the measured power consumption is the power actually consumed by the PD 400 currently.

$$P_{rmn} = P_{bank} - \mathrm{SUM}(P_{mear}) \quad \text{(formula 2)}$$

Since the system of an electronic device is not stable when the device is just started, the variation amplitude of the power is extremely unstable at this time. That is, the current of the PD 400 varies intensely in the startup stage, and when the electronic device is completely started and enters a stable state, the power is relatively stable. In other words, the current of the PD 400 is in a stable state in the power supply stage. Therefore, the variation amplitude of the measured power consumption measured by the controller 110 in the startup stage of the PD 400 is greater than the variation amplitude of the measured power consumption measured by the controller 110 in the power supply stage of the PD 400.

In some embodiments, the measured power consumption is an average power consumption of the PD 400 that is measured by the controller 110 in a time window. That is, the controller 110 measures the energy consumed by the PD 400 in the time window through the port 120, and obtains the average power consumption through calculation according to the consumed energy and the time window. Specifically, the controller 110 calculates the average power consumption by dividing the consumed energy by the time window. In some embodiments, the time window may be a time window conforming to the standards of IEEE802.3af, IEEE802.3at, and IEEE802.3bt, for example, 1 second. In some embodiments, the controller 110 periodically measures the measured power consumption of the PD 400. For example, the controller 110 measures the measured power consumption of the PD 400 every other time window.

The power quota may be the maximum power that the Ethernet PSE 100 can supply to the PD 400 or the maximum power that the PD 400 can bear, and the measured power consumption may be the actual power consumption of the PD 400. Therefore, the measured power consumption of the PD 400 does not exceed the allocated power quota. Therefore, the controller 110 calculates the remaining power quota based on the power quota that is higher than the measured power consumption for the PD 400 in the startup stage.

In step S205, after calculating the remaining power quota, the controller 110 evaluates whether to allow the PD 400 to be powered to enter the startup stage according to the remaining power quota. If a requested power of the PD 400 to be powered is less than the remaining power quota, the controller 110 allows the PD 400 to be powered to enter the startup stage, that is, allows the PD 400 in the grading stage to enter the startup stage. Then, the controller 110 performs step S205 and step S207. The Ethernet PSE 100 continuously supplies power to the PD 400 to enable the PD 400 to enter the power supply stage. If the requested power of the PD 400 to be powered is not less than the remaining power quota, the controller 110 ends the process (not shown). In some embodiments, the requested power may be a rated power of the PD 400.

In some embodiments, in step S205, the controller 110 adds power quotas of PDs 400 in the startup stage at a time point to obtain a first sum, adds measured power consumptions of PDs 400 in the power supply stage at the same time point to obtain a second sum, and subtracts the first sum and the second sum from the total power of the Ethernet PSE 100 to obtain the remaining power quota through calculation. As shown in formula 3, $P_{rmn}$ is a remaining power quota, $P_{bank}$ is a total power, $P_{alc}$ is a power quota, and $P_{mear}$ is a measured power consumption. The time point may be a time point when the PD 400 to be powered has experienced the grading stage and is being evaluated by the controller 110 of the Ethernet PSE 100 whether to be allowed to enter the startup stage. The total power is the total power received by the Ethernet PSE 100 from the power supply 300.

$$P_{rmn}=P_{bank}-\text{SUM}(P_{alc})-\text{SUM}(P_{mear}) \quad \text{(formula 3)}$$

If the remaining power quota is calculated completely based on the power quota, for example, by using the maximum power that can be supplied by the Ethernet PSE 100, a total quantity of the PDs 400 to which the Ethernet PSE 100 can supply power will be greatly reduced. However, when the PD 400 is in the startup stage, if the remaining power quota is calculated by using the measured power consumption, for example, by using the actual power consumption of the PD 400, power hiccups will be caused. Therefore, the remaining power quota is calculated based on the power quota of the PD 400 in the startup stage and the measured power consumption of the PD 400 in the power supply stage, thereby avoiding the power hiccups and greatly increasing the total quantity of the PDs 400 to which the Ethernet PSE 100 can supply power.

In some embodiments, the controller 110 determines a duration of the startup stage according to a requested power supply rate of the PD 400 and an overload tolerance of the Ethernet PSE 100. For example, if the overload tolerance of the Ethernet PSE 100 is relatively poor or the requested power supply rate is relatively high, the duration of the startup stage will be shorter; otherwise, the duration of the startup stage will be longer. The requested power supply rate may be a rate at which the PD 400 requests the Ethernet PSE 100 to gradually increase the voltage from a low voltage to the fully-loaded output voltage (or the rated output voltage) in step S207. The overload tolerance may be an upper limit of the maximum output current that the Ethernet PSE 100 can bear or an over current protection (OCP) point.

Therefore, according to some embodiments, when the PD 400 enters the startup stage, the Ethernet PSE 100 calculates the remaining power quota of the Ethernet PSE 100 based on the power quota allocated to the PD 400, to ensure that the remaining power of the Ethernet PSE 100 is sufficient to be supplied to other PDs 400, thereby avoiding power hiccups when a plurality of PDs 400 request power supply in a short time and improving the power supply quality of the Ethernet PSE 100. In addition, the remaining power quota is calculated based on the power quota or the measured power consumption according to the stage of each PD 400, instead of based only on the power quota, so that power resources can be more effectively used.

What is claimed is:

1. An apparatus comprising:
    a plurality of ports, wherein each port is configured for coupling to a powered device (PD) for supplying power to the PD through the port when the PD is in a power supply stage; and
    a controller configured to calculate a remaining power quota based on a power quota allocated to the PD when the PD enters a startup stage before the power supply stage;
    wherein the controller adds the power quotas of the PDs in the startup stage at a time point to obtain a first sum, adds a plurality of measured power consumptions of the PDs in the power supply stage at the same time point to obtain a second sum, and subtracts the first sum and the second sum from a total power of the apparatus to obtain the remaining power quota.

2. The apparatus according to claim 1, wherein when the PD is in the power supply stage, the controller calculates the remaining power quota based on the measured power consumption of the PD.

3. The apparatus according to claim 2, wherein a variation amplitude of the measured power consumption of each PD in the startup stage is greater than a variation amplitude of the measured power consumption of the PD in the power supply stage.

4. The apparatus according to claim 2, wherein the measured power consumption is an average power consumption measured in a time window.

5. The apparatus according to claim 2, wherein the measured power consumption of each PD does not exceed the power quota allocated to the PD.

6. The apparatus according to claim 1, wherein when the PD is in a grading stage, the controller detects a power level of the PD, to determine the power quota allocated to the PD according to the power level.

7. The apparatus according to claim 1, wherein the time point is a time point at which the controller evaluates whether to allow the PD to be powered to enter the startup stage.

8. The apparatus according to claim 7, wherein when a requested power of the PD to be powered is less than the remaining power quota obtained through calculation, the controller allows the PD to be powered to enter the startup stage.

9. The apparatus according to claim 1, wherein the controller determines a duration of the startup stage according to a requested power supply rate of each PD and an overload tolerance of the apparatus.

10. A power management method of an Ethernet power sourcing equipment (PSE), comprising:
    supplying power to a powered device (PD) when the PD is in a power supply stage; and
    calculating a remaining power quota based on a power quota allocated to the PD when the PD enters a startup stage before the power supply stage;
    wherein the Ethernet PSE is coupled to a plurality of PDs, and the step of calculating the remaining power quota based on the power quota allocated to the PD when the PD enters the startup stage before the power supply stage in the power management method further comprises:
        adding the power quotas of the PDs in the startup stage at a time point to obtain a first sum;

adding a plurality of measured power consumptions of the PDs in the power supply stage at the same time point to obtain a second sum; and subtracting the first sum and the second sum from a total power of the Ethernet PSE to obtain the remaining power quota.

11. The power management method of the Ethernet PSE according to claim 10, further comprising:

calculating the remaining power quota based on the measured power consumption of the PD when the PD is in the power supply stage.

12. The power management method of the Ethernet PSE according to claim 11, wherein a variation amplitude of the measured power consumption of the PD in the startup stage is greater than a variation amplitude of the measured power consumption of the PD in the power supply stage.

13. The power management method of the Ethernet PSE according to claim 11, wherein the measured power consumption is an average power consumption measured in a time window.

14. The power management method of the Ethernet PSE according to claim 11, wherein the measured power consumption of the PD does not exceed the power quota allocated to the PD.

15. The power management method of the Ethernet PSE according to claim 10, further comprising:

detecting a power level of the PD when the PD is in a grading stage, and determining the power quota allocated to the PD according to the power level.

16. The power management method of the Ethernet PSE according to claim 10, wherein the time point is a time point at which whether to allow the PD to be powered to enter the startup stage is evaluated.

17. The power management method of the Ethernet PSE according to claim 16, further comprising:

allowing the PD to be powered to enter the startup stage when a requested power of the PD to be powered is less than the remaining power quota obtained through calculation.

18. The power management method of the Ethernet PSE according to claim 10, further comprising:

determining a duration of the startup stage according to a requested power supply rate of the PD and an overload tolerance of the Ethernet PSE.

\* \* \* \* \*